US012198050B2

(12) United States Patent
Shan et al.

(10) Patent No.: US 12,198,050 B2
(45) Date of Patent: Jan. 14, 2025

(54) ARTIFICIAL INTELLIGENCE DRIVEN IDENTIFICATION OF APPLICATION PROGRAMMING INTERFACE RELATIONSHIPS

(71) Applicant: International Business Machines Corporation, Armonk, NY (US)

(72) Inventors: Wei Shan, Beijing (CN); Wei Chuan Liu, Beijing (CN); Na Lv, Beijing (CN); Jing Quan, Beijing (CN); Hui Qiu, Beijing (CN); Gu Juan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 870 days.

(21) Appl. No.: 17/304,407

(22) Filed: Jun. 21, 2021

(65) Prior Publication Data

US 2022/0405567 A1    Dec. 22, 2022

(51) Int. Cl.
| | |
|---|---|
| *G06F 9/54* | (2006.01) |
| *G06N 3/04* | (2023.01) |
| *G06N 3/08* | (2023.01) |

(52) U.S. Cl.
CPC .............. *G06N 3/08* (2013.01); *G06F 9/541* (2013.01); *G06N 3/04* (2013.01)

(58) Field of Classification Search
None
See application file for complete search history.

(56) References Cited

U.S. PATENT DOCUMENTS

| | | | |
|---|---|---|---|
| 9,396,046 B2 * | 7/2016 | Laredo | ...................... G06F 9/54 |
| 9,720,812 B2 | 8/2017 | Rajamanicham et al. | |
| 10,423,519 B2 | 9/2019 | Andrejko et al. | |
| 10,853,150 B1 | 12/2020 | Bahrami et al. | |
| 2019/0332667 A1 | 10/2019 | Williams et al. | |
| 2020/0065160 A1 | 2/2020 | Park et al. | |
| 2021/0089375 A1 * | 3/2021 | Ghafourifar | ............ G06F 9/453 |

OTHER PUBLICATIONS

Velickovic et al., "Graph Attention Networks", Sixth International Conference on Learing Representations (ICLR) 2018, Vancouver, Canada, Apr. 30-May 3, 2018, 12 pages.

* cited by examiner

*Primary Examiner* — Craig C Dorais
(74) *Attorney, Agent, or Firm* — Yee & Associates, P.C.

(57) ABSTRACT

A computer-implemented method, system, and computer program product for identifying application programming interface relationships of a product. Entity information for the product is generated. The entity information identifies a plurality of entities of the product, attributes of the entities, and relationships between the entities. The plurality of entities include application programming interfaces of the product and other entities of the product. The entity information is processed by a graph attention network to identify degrees of relationships between the application programming interfaces and the entities of the product.

20 Claims, 8 Drawing Sheets

ARTIFICIAL INTELLIGENCE DRIVEN IDENTIFICATION OF APPLICATION PROGRAMMING INTERFACE RELATIONSHIPS

BACKGROUND

1. Field

The disclosure relates generally to software development and testing. More particularly, illustrative embodiments relate to a computer implemented method, a system, and a computer program product for using artificial intelligence to identify the relationships between application programming interfaces in software to improve testing of the software.

2. Description of the Related Art

In software engineering, the combined practices of continuous integration and either continuous delivery or continuous deployment, CI/CD, bridges the gaps between development and operation activities and teams by enforcing automation in building, testing and deployment of software applications. A continuous integration continuous deployment practice, or CI/CD pipeline, may form the backbone of current software development and information technology operations. Current software development and information technology operations practices therefore may involve continuous development, continuous testing, continuous integration, continuous deployment, and continuous monitoring of a software application throughout its development life cycle.

An application programming interface, API, is an interface for a software application that defines interactions between multiple software applications or mixed hardware-software intermediaries. An application programming interface defines the kinds of calls or requests that can be made to a software application, how to make them, the data formats that should be used, the conventions to follow, and the like. An application programming interface may also provide extension mechanisms so that users can extend existing functionality of a software application in various ways and to varying degrees.

Software testing may involve the execution of a software component or system component to evaluate one or more properties of interest. In general, these properties may indicate the extent to which the component or system under test meets the requirements that guided its design and development, responds correctly to all kinds of inputs, performs its functions within an acceptable time, is sufficiently usable, can be installed and run in its intended environments, or achieves the general result its stakeholders desire.

The number of possible tests for a software component may be very large. Therefore, software testing may use some strategy to select tests that are feasible for the available time and resources. It is desirable that a software testing strategy is as effective and efficient as possible. An effective software testing strategy will detect failures in the operation of the software so that any defects in the software may be discovered and corrected. An efficient software testing strategy may achieve a desired level of effectiveness with, for example, fewer tests, less complicated tests, or in less time or with less expense than a less efficient software testing strategy.

Software testing may be conducted as soon as executable software exists, even if the software is only partially complete. The overall approach to software development may determine when and how testing is conducted. For example, in the frequent development cycles of continuous integration and continuous deployment of software, the automated testing of application programming interfaces is desirable. However, current methods for the automated testing of application programming interfaces may be inefficient.

Therefore, it would be desirable to have a method and apparatus that take into account at least some of the issues discussed above, as well as other possible issues. For example, it would be desirable to have a method and apparatus that overcome technical problems with the testing of application programming interfaces.

SUMMARY

According to illustrative embodiments, a computer-implemented method of identifying application programming interface relationships of a product is provided. Entity information for the product is generated. The entity information identifies a plurality of entities of the product, attributes of the entities, and relationships between the entities. The plurality of entities comprise application programming interfaces of the product and other entities of the product. The entity information is processed by a graph attention network to identify degrees of relationships between the application programming interfaces and the entities of the product.

According to illustrative embodiments, a system for identifying application programming interface relationships of a product is provided. The system comprises an entity builder and a graph attention network. The entity builder is configured to generate entity information for the product. The entity information identifies a plurality of entities of the product, attributes of the entities, and relationships between the entities. The plurality of entities comprise application programming interfaces of the product and other entities of the product. The graph attention network is configured to process the entity information to identify degrees of relationships between the application programming interfaces and the entities of the product.

According to illustrative embodiments, a computer program product for identifying application programming interface relationships of a product is provided. The computer program product comprises a computer readable storage medium having program instructions embodied therewith. The program instructions executable by a device to cause the device to generate entity information for the product. The entity information identifies a plurality of entities of the product, attributes of the entities, and relationships between the entities. The plurality of entities comprise application programming interfaces of the product and other entities of the product. The program instructions are also executable by the device to cause the device to process the entity information by a graph attention network to identify degrees of relationships between the application programming interfaces and the entities of the product.

Other variations are possible, as described below.

DETAILED DESCRIPTION

The illustrative embodiments recognize and take into account that, in frequent software development cycles, automated testing of application programming interfaces is desirable, but often inefficient. Currently, test coverage focuses on development and code.

Illustrative embodiments use the power of artificial intelligence to transform traditional approaches to software and application development and testing to accelerate the pace of production. Illustrative embodiments provide a system and method for using an artificial intelligence algorithm and model to identify the application programming interface relationships. Illustrative embodiments provide an appropriate scope or the minimal set of application programming interfaces for testing.

Illustrative embodiments utilize a graph attention network to derive an application programming interface relationship network that further expands test coverage and provides the minimal set of application programming interfaces for testing, making development and testing more efficient. Illustrative embodiments extend the coverage of application programming interface relationships to including characteristics of a software product to be tested, such as application programming interfaces, software functionality, software users, business requirements of the software, etc.

Illustrative embodiments establish an application programming interface relationship network by a graph attention network learner and builder. From the application programming interface relationship network, a minimal set of application programming interfaces for testing may be determined, based on various kinds of scenarios. Illustrative embodiments provide for analyzing the application programming interface relationship network and exploiting the business insights.

Illustrative embodiment thus may improve application programming interface automated testing in frequent development cycles by use of a graph attention network learner and builder. Illustrative embodiments may help customers to reduce the business risk in production of software applications, including internet of things application products.

Figure 1:
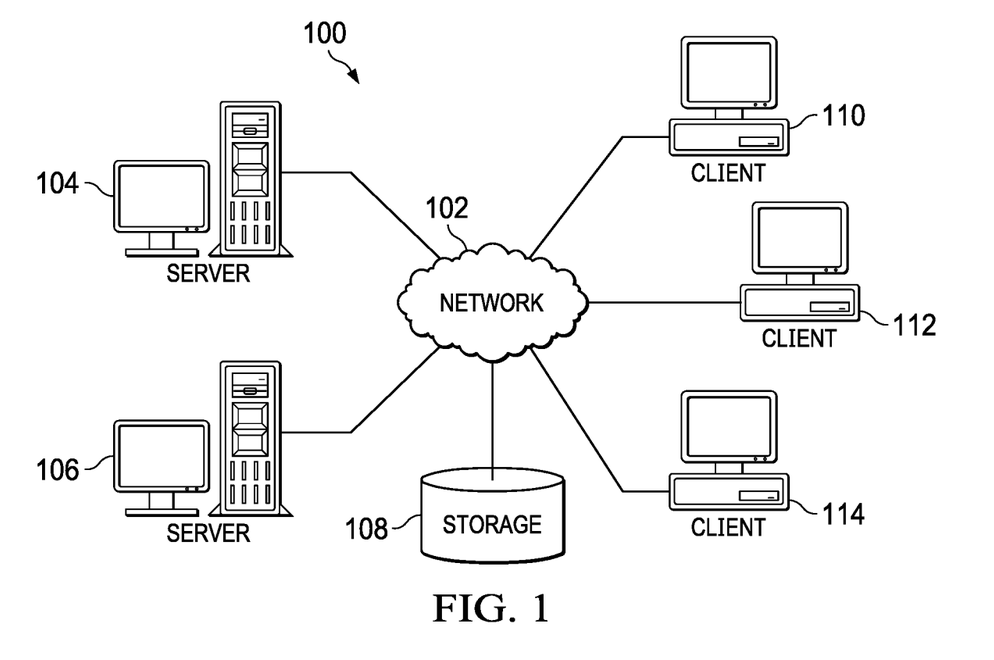
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computer 110, client computer 112, and client computer 114 connect to network 102. Client computers 110, 112, and 114 can be, for example, computers, workstations, or network computers. In the depicted example, server computer 104 provides information, such as boot files, operating system images, and applications to client computers 110, 112, and 114. In this illustrative example, server computer 104, server computer 106, storage unit 108, and client computers 110, 112, and 114 are network devices that connect to network 102 in which network 102 is the communications media for these network devices.

Client computers 110, 112, and 114 are clients to server computer 104 in this example. Network data processing system 100 may include additional server computers, client computers, and other devices not shown. Client computers 110, 112, and 114 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client computers 110, 112, or 114 over network 102 for use on client devices 110, 112, or 114.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

The phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
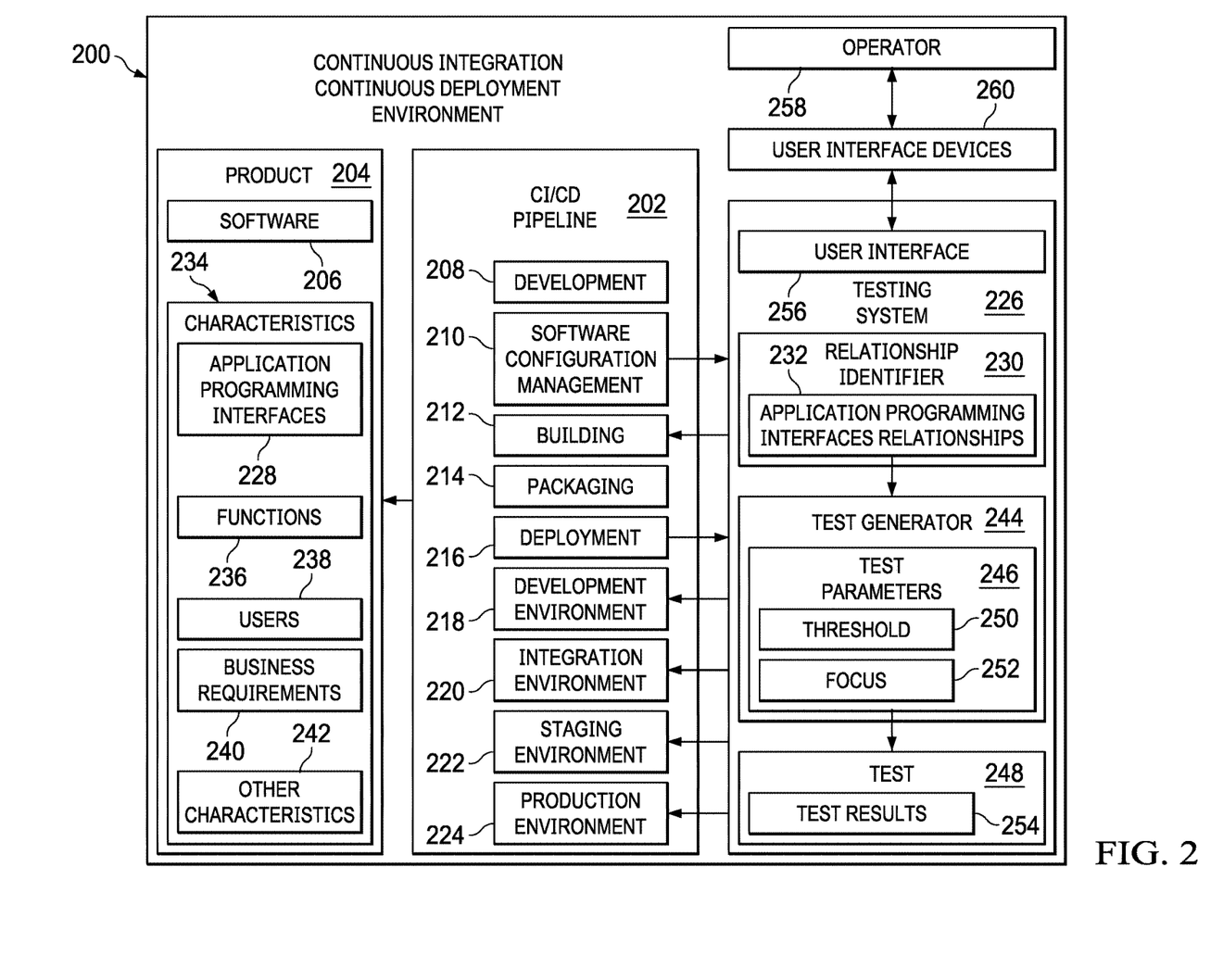
FIG. 2 is a block diagram of a continuous integration continuous deployment environment in accordance with an illustrative embodiment.

Turning to FIG. 2, a block diagram of a continuous integration continuous deployment environment is depicted in accordance with an illustrative embodiment. Continuous integration continuous deployment environment 200 also may be referred to as a continuous integration continuous delivery environment. In this illustrative example, continuous integration continuous deployment environment 200 includes components that may be implemented in hardware, such as the hardware shown in network data processing system 100 in FIG. 1.

Continuous integration continuous deployment environment 200 features the use of CI/CD pipeline 202 for the development, deployment, and operation of product 204. Product 204 is a software product or includes software 206. For example, without limitation, product 204 may be a software application.

CI/CD pipeline 202 includes various processes for the development, deployment, and operation of product 204. Processes included in CI/CD pipeline 202 include, without limitation, development 208, software configuration management 210, building 212, packaging 214, and deployment 216. Deployment 216 of product 204 may be to various different environments. For example, without limitation, deployment 216 may be to development environment 218, integration environment 220, staging environment 222, or production environment 224.

Product 204 may be tested at various points in CI/CD pipeline 202. For example, without limitation, product 204 may be tested before building 212 and packaging 214 of product 204 and before deployment 216 of product 204 to one of development environment 218, integration environment 220, staging environment 222, or production environment 224.

Testing of product 204 may be performed by an appropriate testing system 226. Testing of product 204 may include, for example, without limitation, testing application programming interfaces 228 of product 204.

In accordance with an illustrative embodiment, testing system 226 may include relationship identifier 230. Relationship identifier 230 is configured to use artificial intelligence to determine application programming interfaces relationships 232 of application programming interfaces 228 in product 204. In accordance with an illustrative embodiment, application programming interfaces relationships 232 includes relationships between application programming interfaces 228 of product 204 and other appropriate characteristics 234 of product 204. For example, without limitation, application programming interfaces relationships 232 may include relationships between application programming interfaces 228 of product 204 and one or more of functions 236 performed by product 204, users 238 of product 204, business requirements 240 of product, 204 or other characteristics 242 of product 204.

Application programming interfaces relationships 232 may be used by test generator 244 to generate appropriate test parameters 246 for test 248 to be conducted on product 204. For example, without limitation, test parameters 246 may include threshold 250 level of relationships for application programming interfaces 228 to be tested. Test parameters 246 may specify focus 252 of application programming interfaces 228 related to particular characteristics 234 to be tested. Testing system 226 may be configured to conduct test 248 of product 204 using test parameters 246 to generate test results 254.

Testing system 226 may include any appropriate user interface 256 to provide for interaction of operator 258 with testing system 226. Operator 258 may be any appropriate human operator of testing system 226. Operator 258 may interact with user interface 256 via any appropriate user interface devices 260.

The illustration of continuous integration continuous deployment environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
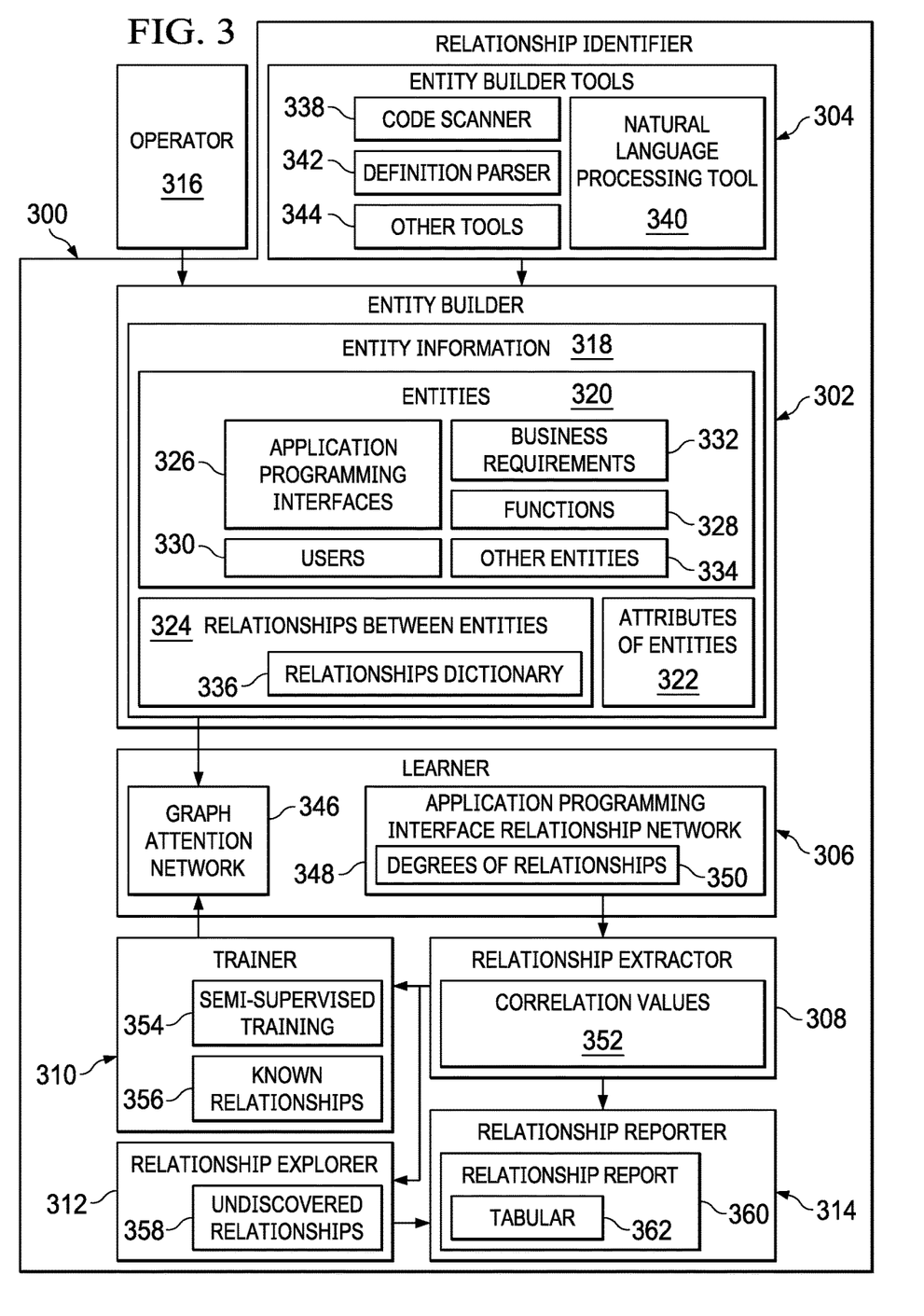
FIG. 3 is a block diagram of a relationship identifier in accordance with an illustrative embodiment.

With reference to FIG. 3, a block diagram of a relationship identifier is depicted in accordance with an illustrative embodiment. Relationship identifier 300 is an example of one implementation of relationship identifier 230 in continuous integration continuous deployment environment 200 in FIG. 2. Relationship identifier 300 includes entity builder 302, entity builder tools 304, relationship learner 306, relationship extractor 308, trainer 310, relationship explorer 312, and relationship reporter 314.

Relationship identifier 300 may be implemented in software, hardware, firmware or a combination thereof. When software is used, the operations performed by relationship identifier 300 may be implemented in program code configured to run on hardware, such as a processor unit. When firmware is used, the operations performed by relationship identifier 300 may be implemented in program code and data and stored in persistent memory to run on a processor unit. When hardware is employed, the hardware may include circuits that operate to perform the operations in relationship identifier 300.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Entity builder 302 is configured to allow operator 316 to generate entity information 318 for a software product, such as product 204 in continuous integration continuous deployment environment 200 in FIG. 2. Entity information 318 defines various characteristics of the software product. For example, without limitation, entity information 318 may include information defining entities 320, attributes of entities 322, and relationships between entities 324 of the product.

Entities 320 may include application programming interfaces 326 and one or more of functions 328, users 330, business requirements 332, or other entities 334. Relationships between entities 324 may be defined in relationships dictionary 336.

Entity builder tools 304 may include various tools to help operator 316 generate entity information 318 by automating the process of generating entity information 318, in whole or in part. For example, without limitation, entity builder tools 304 may include one or more of code scanner 338, natural language processing tool 340, definition parser 342, and other appropriate tools 344.

Learner 306 is configured to process entity information 318 by graph attention network 346 to generate application programming interface relationship network 348. Application programming interface relationship network 348 indicates degrees of relationships between application programming interfaces 326 and entities 320 of the product defined by entity information 318.

Processing entity information 318 by graph attention network 346 includes defining the classes of the entities in entity information 318 as:

$$T=\{t1,t2,t3,\ldots\}$$

The attributes of the entities are:

$$A = \begin{bmatrix} [attr \text{ for entity } 1], \\ [attr \text{ for entity } 2], \\ [attr \text{ for entity } 3], \\ \ldots \end{bmatrix}.$$

$V=\{V1, V2, V3, \ldots\} \in R^{F^i}$ is the attributes vectors for each of the entities.

Using the features conversion matrix:
$W_{t_i} \in R^{F \times F^i}$, results in the converted entities:

$$X = W \cdot V$$

The relationships defined in entity information 318 are:

$$R=\{r1,r2,r3\}$$

The attention parameter is defined as:

$$\alpha_{ij} = \frac{\exp(LeakyReLU(W_a^{rm})^T[X_i\|X_j])}{\sum_{s \in N_i^{rm}} \exp(LeakyReLU(W_a^{rm})^T[X_i\|X_s])}.$$

The embedded form is calculated as:

$$z_i^{rm} = \sigma\left(\sum_{j \in N_i^{rm}} \alpha_{ij}^{rm} \cdot X_j\right).$$

With the same steps, the final embedded form is calculated as:

$$z_i^{rm} = \sigma(\Sigma_{z \in r_m} \beta^{rm} \cdot Z_j)$$

Relationship extractor 308 is configured to determine correlation values 352 for the relationships between application programming interfaces 326 and entities 320 from application programming interface relationship network 348.

For example, relationship extractor 308 may define each of the embedded form:

$$z'_i = \text{sigmoid}(W_c \cdot z_i) = [f_1, f_2, \ldots f_c]$$

With c=2 (related or not), determine correlation values 352 as the confidence:

$$P_i^{fx} = \frac{\exp(f_x)}{\sum_{k=1}^{C} \exp(f_c)}.$$

Trainer 310 is configured to provide semi-supervised training 354 of graph attention network 346 using known relationships 356. Known relationships 356 may be any knowledge of relationships between application programming interfaces 326 and entities 320 from any appropriate source. For example, without limitation, known relationships 356 may be from operator 316, based on customer support cases, or from any other appropriate source.

Trainer 310 may define a loss function, such as cross-entropy function:

$$L = -\Sigma_{l \in Y_L} \Sigma_{x=1}^{C} y_l^{fx} \ln(P_l^{fx})$$

The loss function is used in back-propagation to update the W parameters used in graph attention network 346.

Relationship explorer 312 is configured to identify undiscovered relationships 358 in application programming interface relationship network 348. Undiscovered relationships 358 are relationships between application programming interfaces 326 and entities 320 that are not initially defined in entity information 318. Relationship explorer 312 uses an algorithm to identify such new relationships.

Relationship reporter 314 generates relationship report 360. Relationship report 360 may report degrees of relationships 350 between application programming interfaces 326 and entities 320 in any appropriate format. For example, without limitation, relationship report 360 may be tabular 362 report of correlation values 352 that indicates degrees of relationships 350 between application programming interfaces 326 and entities 320. Undiscovered relationships 358 identified by relationship explorer 312 may be included in relationship report 360.

The illustration of relationship identifier 300 in FIG. 3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 4:
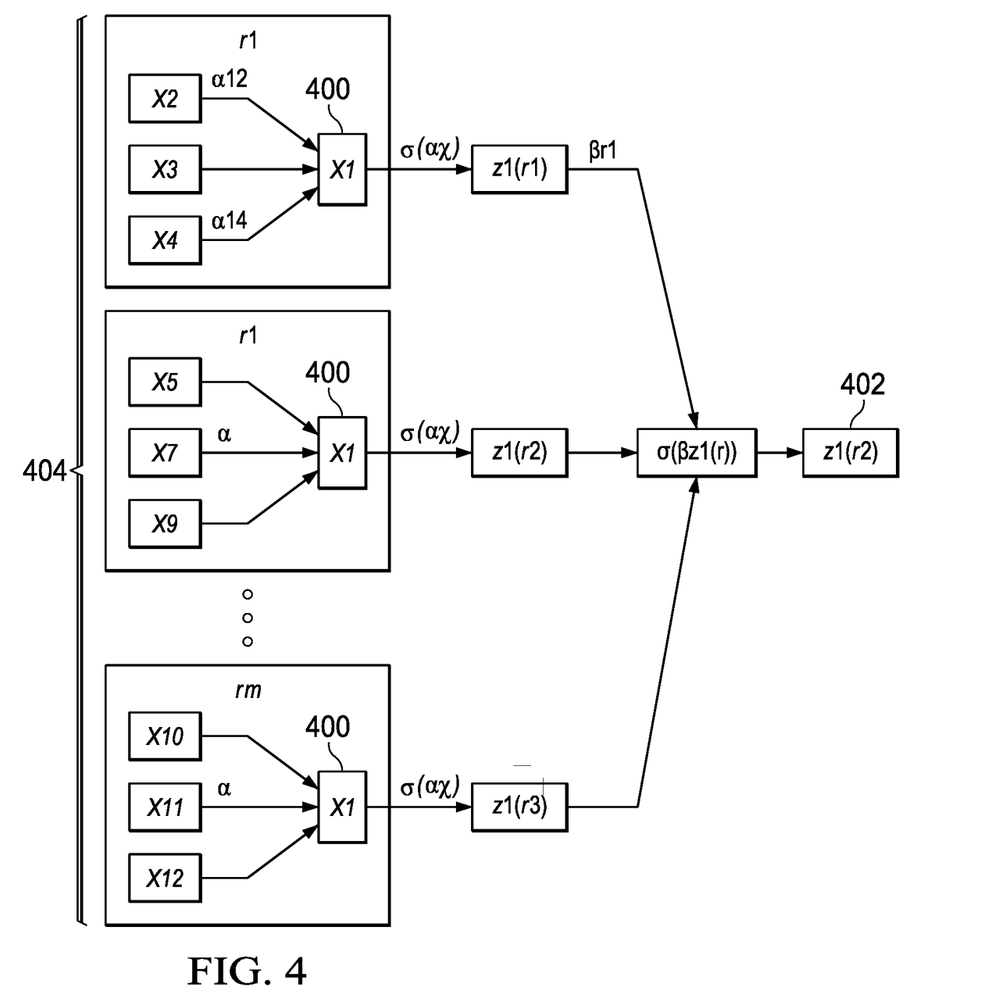
FIG. 4 is an illustration of an example of graph attention network processing in accordance with an illustrative embodiment.

Turning to FIG. 4, an illustration of an example of graph attention network processing is depicted in accordance with an illustrative embodiment. FIG. 4 illustrates an example of the conversion of entity X1 400 to entity z1 402 by a graph attention network, such as graph attention network 346 in relationship identifier 300 in FIG. 3, such that the attributes of entities X2-X12 404 that are related to entity X1 400, and the relationship between entity X1 400 and entities X2-X12 404 are used in determining the attributes for entity z1 402.

Figure 5:
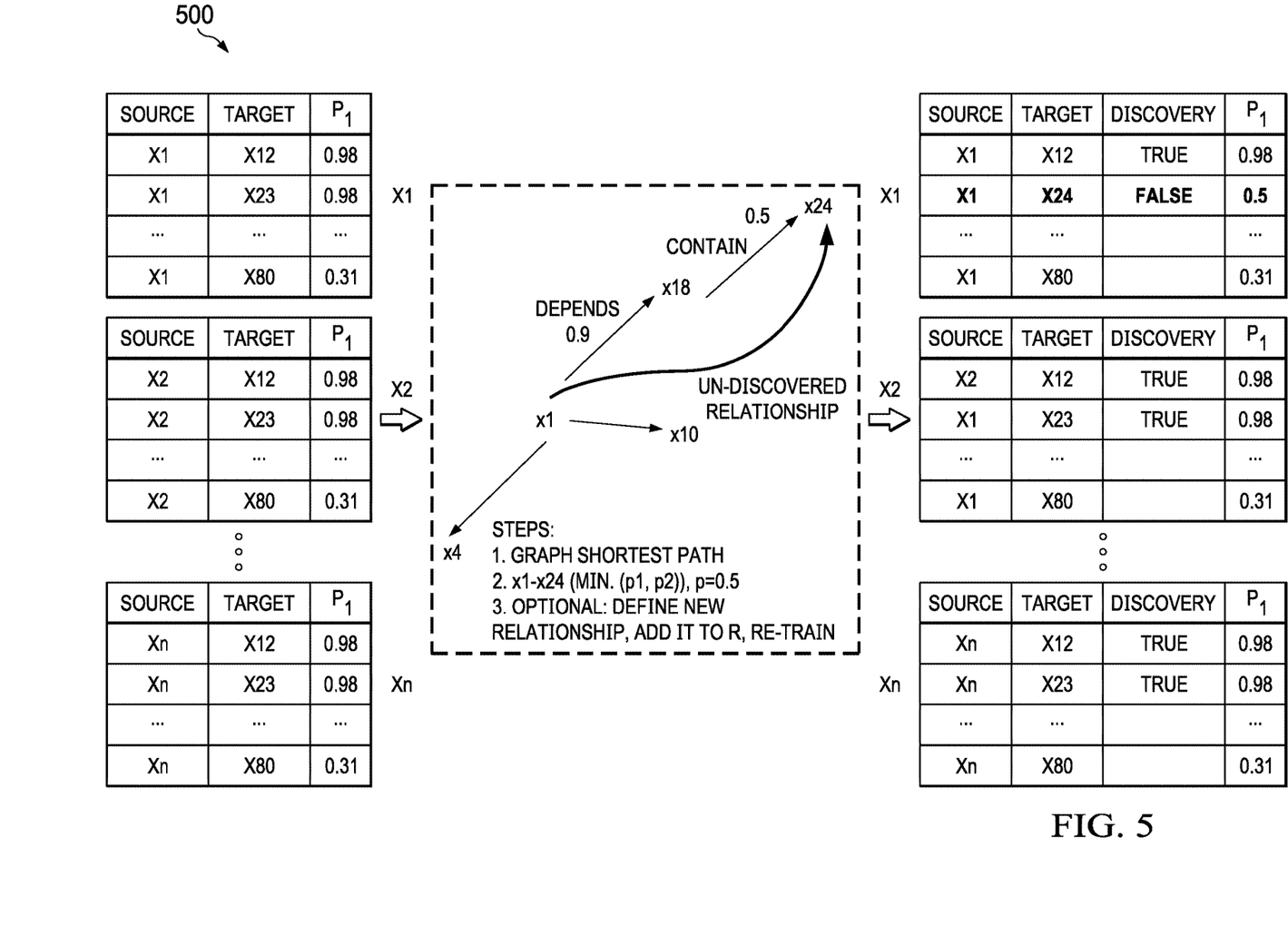
FIG. 5 is an illustration of an example of identifying an undiscovered relationship by a relationship explorer in accordance with an illustrative embodiment.

Turning to FIG. 5, an illustration of an example of identifying an undiscovered relationship by a relationship explorer is depicted in accordance with an illustrative embodiment. Process 500 in FIG. 5 may be performed by relationship explorer 312 in relationship identifier 300 in FIG. 3.

Figure 6:
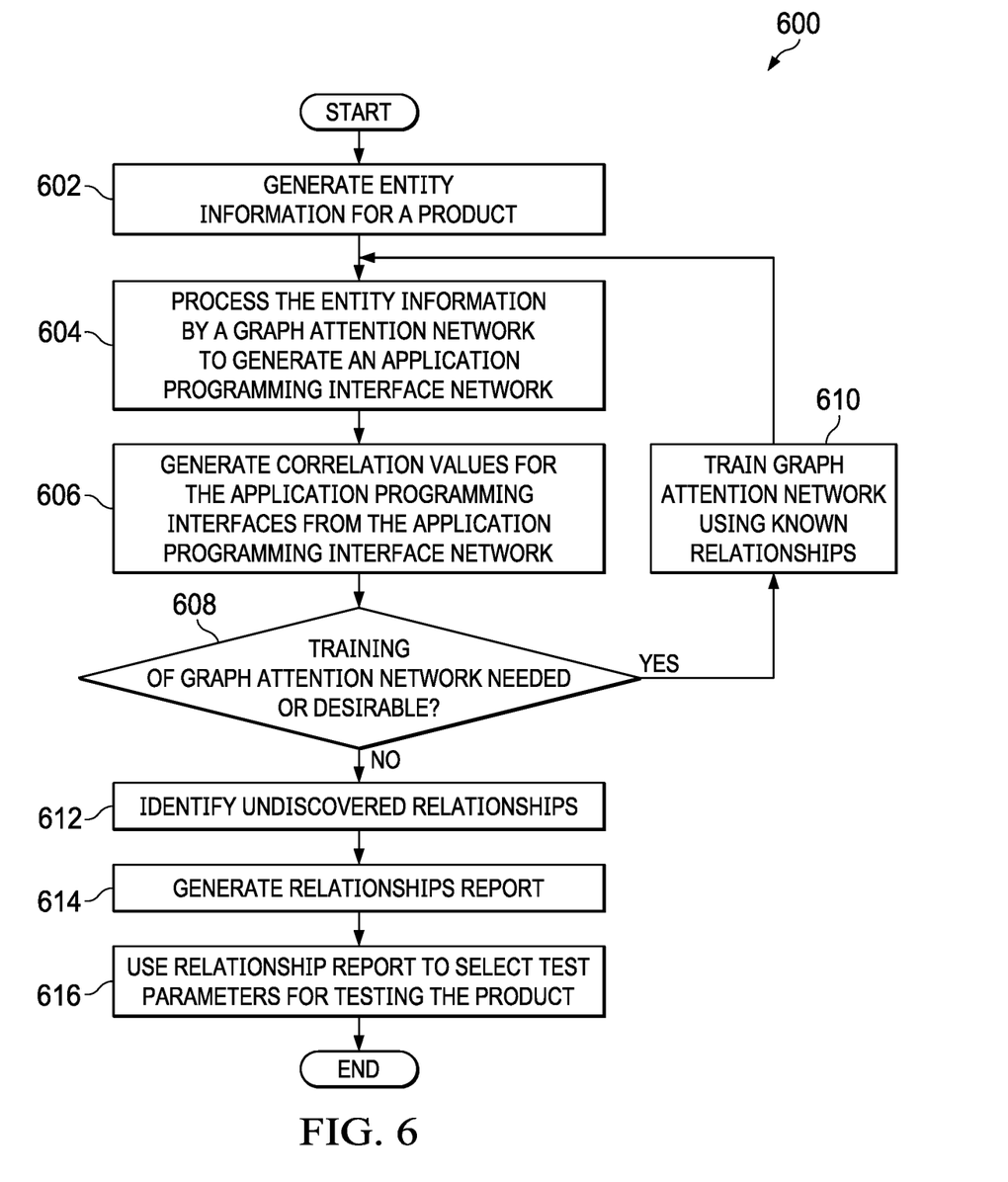
FIG. 6 is an illustration of a flowchart of a process for identifying application programming interface relationships in accordance with an illustrative embodiment.

Turning to FIG. 6, an illustration of a flowchart of process 600 for identifying application programming interface relationships is depicted in accordance with an illustrative embodiment. For example, without limitation, process 600 may be implemented in relationship identifier 300 in FIG. 3.

Process 600 may begin with generating entity information for a product (operation 602). The entity information is processed by a graph attention network to generate an application programming interface network (operation 604). Correlation values for the application programming interfaces of the product are generated from the application programming interface network (operation 606).

It may be determined whether training of the graph attention network is needed or desirable (operation 608). In response to a determination that training of the graph attention network is needed or desirable, the graph attention network may be trained using known relationships (operation 610). Process 600 then may continue with processing the entity information by the trained graph attention network at operation 604.

In response to a determination at operation 608 that training of the graph attention network is not needed or desirable, undiscovered relationships may be identified (operation 612). A relationship report then may be generated (operation 614). The relationship report may be used to select test parameters for testing the product (operation 616), with the process terminating thereafter.

Figure 7:
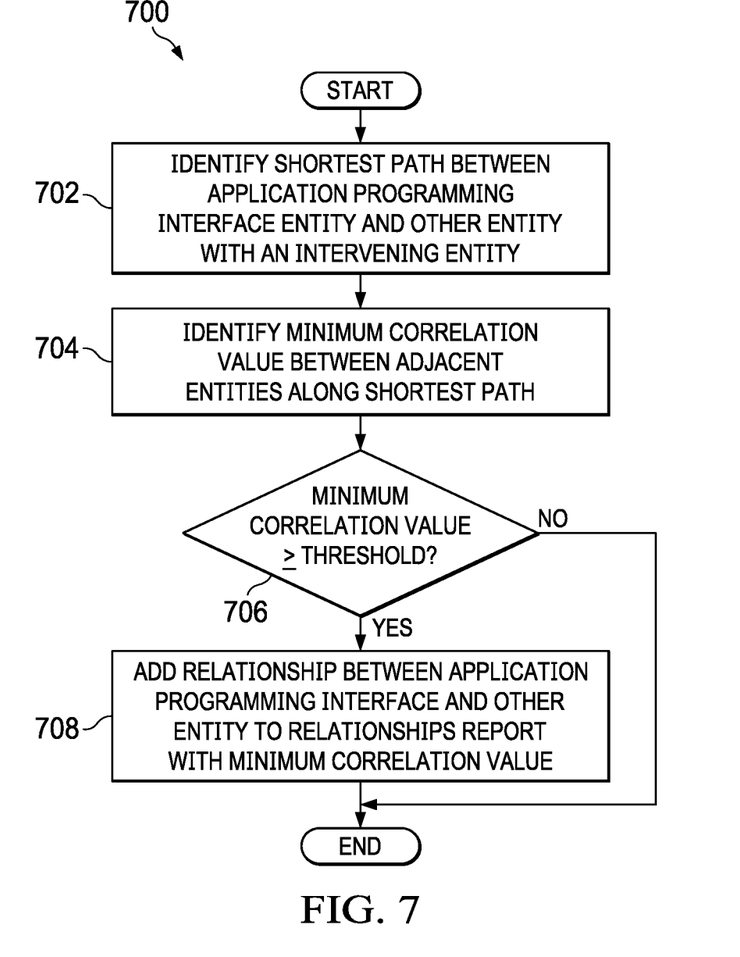
FIG. 7 is an illustration of a flowchart of a process for identifying undiscovered relationships in accordance with an illustrative embodiment.

Turning to FIG. 7, an illustration of a flowchart of process 700 for identifying undiscovered relationships is depicted in accordance with an illustrative embodiment. For example, without limitation, process 700 may be implemented in relationship explorer 312 in relationship identifier 300 in FIG. 3. Process 700 is an example of one implementation of operation 612 in process 600 in FIG. 6.

Process 700 may begin with identifying the shortest path between an application programming interface entity and another entity with an intervening entity (operation 702). The minimum correlation value between adjacent entities along the shortest path is then identified (operation 704). It is then determined whether the identified minimum correlation value is greater than or equal to a threshold (operation 706). In response to a determination that the minimum correlation value is greater than or equal to the threshold, the relationship between the application programming interface and the other entity is added to the relationship report with the correlation value of the relationship being the minimum correlation value identified in operation 704 (operation 708), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 8:
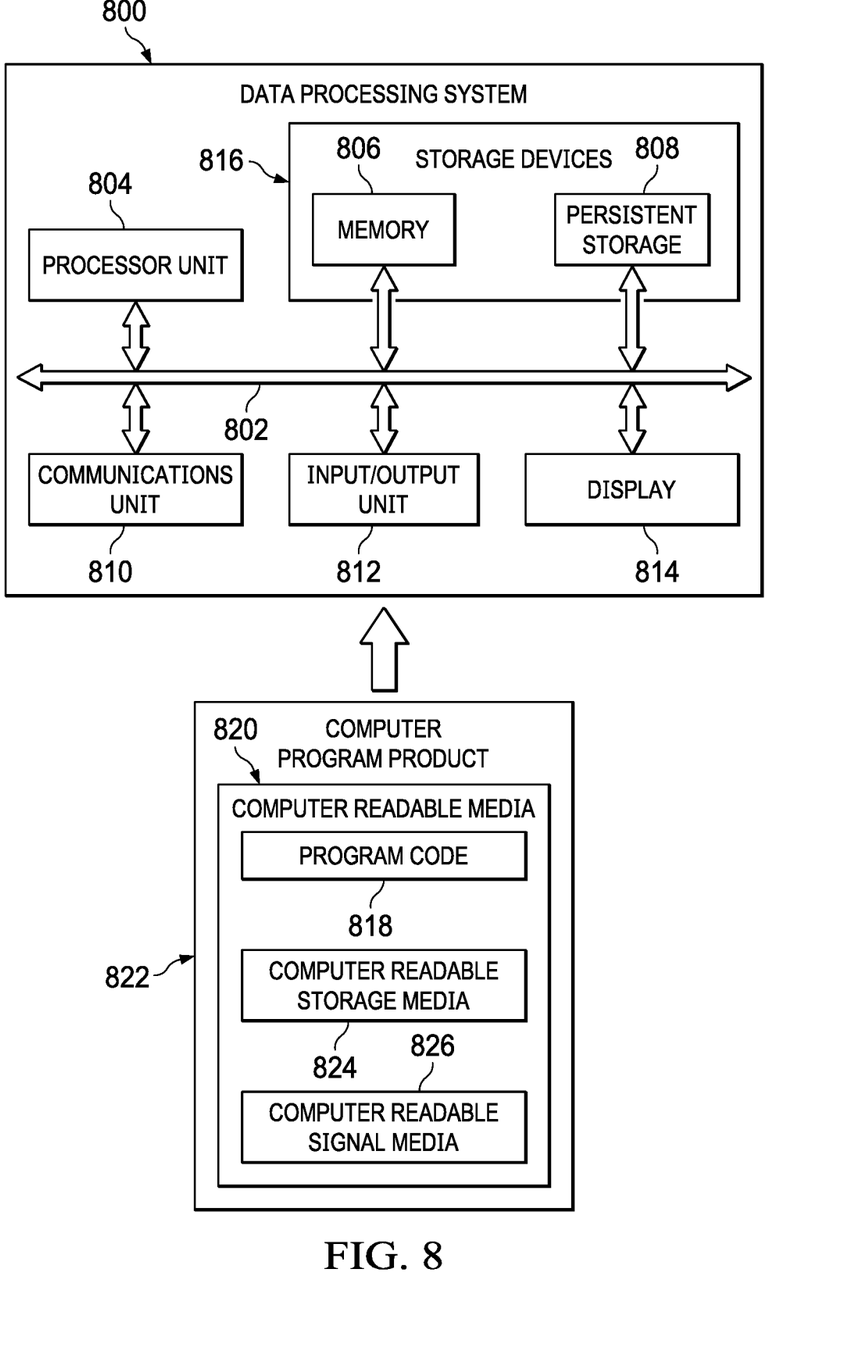
FIG. 8 is a block diagram of a data processing system in accordance with an illustrative embodiment.

Turning to FIG. 8, a block diagram of a data processing system is depicted in accordance with an illustrative embodiment. Data processing system 800 can be used to implement server computer 104, server computer 106, client computer 110, client computer 112, and client computer 114 in FIG. 1. Data processing system 800 can also be used to implement testing system 226 in FIG. 2 or relationship identifier 300 in FIG. 3. In this illustrative example, data processing system 800 includes communications framework 802, which provides communications between processor unit 804, memory 806, persistent storage 808, communications unit 810, input/output (I/O) unit 812, and display 814. In this example, communications framework 802 takes the form of a bus system.

Processor unit 804 serves to execute instructions for software that can be loaded into memory 806. Processor unit 804 includes one or more processors. For example, processor unit 804 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 804 can may be implemented using one or more heterogeneous processor systems in which a main processor is present with secondary processors on a single chip. As another illustrative example, processor unit 804 can be a symmetric multi-processor system containing multiple processors of the same type on a single chip.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, can be, for example, a random-access memory or any other suitable volatile or non-volatile storage device. Persistent storage 808 may take various forms, depending on the particular implementation.

For example, persistent storage 808 may contain one or more components or devices. For example, persistent storage 808 can be a hard drive, a solid-state drive (SSD), a flash memory, a rewritable optical disk, a rewritable magnetic tape, or some combination of the above. The media used by persistent storage 808 also can be removable. For example, a removable hard drive can be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that can be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs can be located in storage devices 816, which are in communication with processor unit 804 through communications framework 802. The processes of the different embodiments can be performed by processor unit 804 using computer-implemented instructions, which may be located in a memory, such as memory 806.

These instructions are referred to as program code, computer usable program code, or computer-readable program code that can be read and executed by a processor in processor unit 804. The program code in the different embodiments can be embodied on different physical or computer-readable storage media, such as memory 806 or persistent storage 808.

Program code 818 is located in a functional form on computer-readable media 820 that is selectively removable and can be loaded onto or transferred to data processing system 800 for execution by processor unit 804. Program code 818 and computer-readable media 820 form computer program product 822 in these illustrative examples. In the illustrative example, computer-readable media 820 is computer-readable storage media 824.

In these illustrative examples, computer-readable storage media 824 is a physical or tangible storage device used to store program code 818 rather than a medium that propagates or transmits program code 818.

Alternatively, program code 818 can be transferred to data processing system 800 using a computer-readable signal media. The computer-readable signal media can be, for example, a propagated data signal containing program code 818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 800 are not meant to provide architectural limitations to the manner in which different embodiments can be implemented. In some illustrative examples, one or more of the components may be incorporated in or otherwise form a portion of, another component. For example, memory 806, or portions thereof, may be incorporated in processor unit 804 in some illustrative examples. The different illustrative embodiments can be implemented in a data processing system including components in addition to or in place of those illustrated for data processing system 800. Other components shown in FIG. 8 can be varied from the illustrative examples shown. The different embodiments can be implemented using any hardware device or system capable of running program code 818.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of identifying application programming interface relationships of a product, comprising:
   generating entity information for the product, wherein the entity information identifies a plurality of entities of the product, attributes of the entities, and relationships between the entities, wherein the plurality of entities comprise application programming interfaces of the product and other entities of the product; and
   processing the entity information by a graph attention network to identify degrees of relationships between the application programming interfaces and the entities of the product.

2. The computer-implemented method of claim 1, wherein the other entities of the product comprise entities selected from the group of entities consisting of functions of the product, users of the product, and business requirements of the product.

3. The computer-implemented method of claim 1, wherein generating the entity information for the product comprises automatically generating the entity information for the product using an entity builder tool selected from the group of tools consisting of a code scanner, a definition parser, and a natural language processing tool.

4. The computer-implemented method of claim 1, wherein:
   processing the entity information by the graph attention network comprises processing the entity information by the graph attention network to generate an application programming interface relationship network; and
   generating correlation values from the application programming interface relationship network, wherein the correlation values indicate the degrees of relationships between the application programming interfaces and the entities of the product.

5. The computer-implemented method of claim 1, wherein:
   the degrees of relationships comprise a first degree of relationship between an application programming interface and a first entity of the product and a second degree of relationship between the first entity of the product and a second entity of the product; and
   further comprising using the first degree of relationship and the second degree of relationship to identify a relationship between the application programming interface and the second entity of the product.

6. The computer-implemented method of claim 1 further comprising training the graph attention network using a known relationship between an application programming interface and an entity of the product.

7. The computer-implemented method of claim 1 further comprising using the degrees of relationships between the application programming interfaces and the entities of the product to select test parameters for testing the product.

8. A system for identifying application programming interface relationships of a product, comprising:
   an entity builder configured to generate entity information for the product, wherein the entity information identifies a plurality of entities of the product, attributes of the entities, and relationships between the entities, wherein the plurality of entities comprise application programming interfaces of the product and other entities of the product; and
   a graph attention network configured to process the entity information to identify degrees of relationships between the application programming interfaces and the entities of the product.

9. The system of claim 8, wherein the other entities of the product comprise entities selected from the group of entities consisting of functions of the product, users of the product, and business requirements of the product.

10. The system of claim 8 further comprising an entity builder tool configured to generate the entity information for the product automatically.

11. The system of claim 8, wherein:
    the graph attention network is configured to process the entity information to generate an application programming interface relationship network; and
    further comprising a relationship extractor configured to generate correlation values from the application programming interface relationship network, wherein the correlation values indicate the levels of relationships between the application programming interfaces and the entities of the product.

12. The system of claim 8, wherein:
the levels of relationships comprise a first level of relationship between an application programming interface and a first entity of the product and a second level of relationship between the first entity of the product and a second entity of the product; and
further comprising a relationship explorer configured to use the first level of relationship and the second level of relationship to identify a relationship between the application programming interface and the second entity of the product.

13. The system of claim 8 further comprising a trainer configured to train the graph attention network using a known relationship between an application programming interface and an entity of the product.

14. The computer-implemented method of claim 1 further comprising a testing system configured to use the levels of relationships between the application programming interfaces and the entities of the product to select test parameters for testing the product.

15. A computer program product for identifying application programming interface relationships of a product, the computer program product comprising a computer readable storage medium having program instructions embodied therewith, the program instructions executable by a device to cause the device to:
generate entity information for the product, wherein the entity information identifies a plurality of entities of the product, attributes of the entities, and relationships between the entities, wherein the plurality of entities comprise application programming interfaces of the product and other entities of the product; and
process the entity information by a graph attention network to identify degrees of relationships between the application programming interfaces and the entities of the product.

16. The computer program product of claim 15, wherein the other entities of the product comprise entities selected from the group of entities consisting of functions of the product, users of the product, and business requirements of the product.

17. The computer program product of claim 15, wherein the program instructions are executable by the device to cause the device to:
process the entity information by the graph attention network to generate an application programming interface relationship network; and
generate correlation values from the application programming interface relationship network, wherein the correlation values indicate the degrees of relationships between the application programming interfaces and the entities of the product.

18. The computer program product of claim 15, wherein:
the degrees of relationships comprise a first degree of relationship between an application programming interface and a first entity of the product and a second degree of relationship between the first entity of the product and a second entity of the product; and
the program instructions are executable by the device to cause the device to use the first degree of relationship and the second degree of relationship to identify a relationship between the application programming interface and the second entity of the product.

19. The computer program product claim 15, wherein the program instructions are executable by the device to cause the device to train the graph attention network using a known relationship between an application programming interface and an entity of the product.

20. The computer program product of claim 15, wherein the program instructions are executable by the device to cause the device to use the degrees of relationships between the application programming interfaces and the entities of the product to select test parameters for testing the product.

* * * * *